United States Patent [19]
Yamada et al.

[11] Patent Number: 5,251,079
[45] Date of Patent: Oct. 5, 1993

[54] TRACKING CONTROL CIRCUIT INCLUDING GAIN CORRECTION CONTROL

[75] Inventors: Makoto Yamada, Tokyo; Masayoshi Noguchi, Chiba; Junji Ono, Tokyo, all of Japan

[73] Assignee: Sony Corporation, Tokyo, Japan

[21] Appl. No.: 610,408

[22] Filed: Nov. 7, 1990

[30] Foreign Application Priority Data

Dec. 30, 1989 [JP] Japan ................................. 1-340278
Dec. 30, 1989 [JP] Japan ................................. 1-340370

[51] Int. Cl.$^5$ ........................................... G11B 5/584
[52] U.S. Cl. ................................ 360/77.14; 360/77.15
[58] Field of Search ........................... 360/77.14, 77.15

[56] References Cited

U.S. PATENT DOCUMENTS 4,587,580  5/1986  Takayama et al. ............... 360/77.14
5,003,413  3/1991  Miyazaki ........................... 360/77.14

FOREIGN PATENT DOCUMENTS

0087811A1   9/1983  European Pat. Off. .
0138210A3   4/1985  European Pat. Off. .
0169479A3   1/1986  European Pat. Off. .
0335417A1  10/1989  European Pat. Off. .

OTHER PUBLICATIONS

G. J. Thaler, *Automatic Control Systems,* 1989, pp. 6, 321, 340.

Primary Examiner—Joseph L. Dixon
Assistant Examiner—David L. Robertson
Attorney, Agent, or Firm—Philip M. Shaw, Jr.

[57] ABSTRACT

A tracking control circuit of a rotary head type magnetic recording and reproducing apparatus. The tracking control circuit generates sampling pulses of first and second pilot signals for tracking based on a synchronization signal for tracking on a recording track, detects an envelope signal from the reproduction signal reproduced by the magnetic heads which is amplified with a predetermined gain, detects tracking error data from first and second pilot data obtained by sampling the envelope signal with the sampling pulses, detects reproduction level error data, controls the feeding speed of the magnetic tape based on the tracking error data, and controls the amplifying gain of the reproduction signal based on the reproduction level error data. As a result, deviations of reproduction levels of the magnetic heads are effectively corrected, and tracking control of the magnetic heads on the recording tracks is extremely precise.

2 Claims, 9 Drawing Sheets

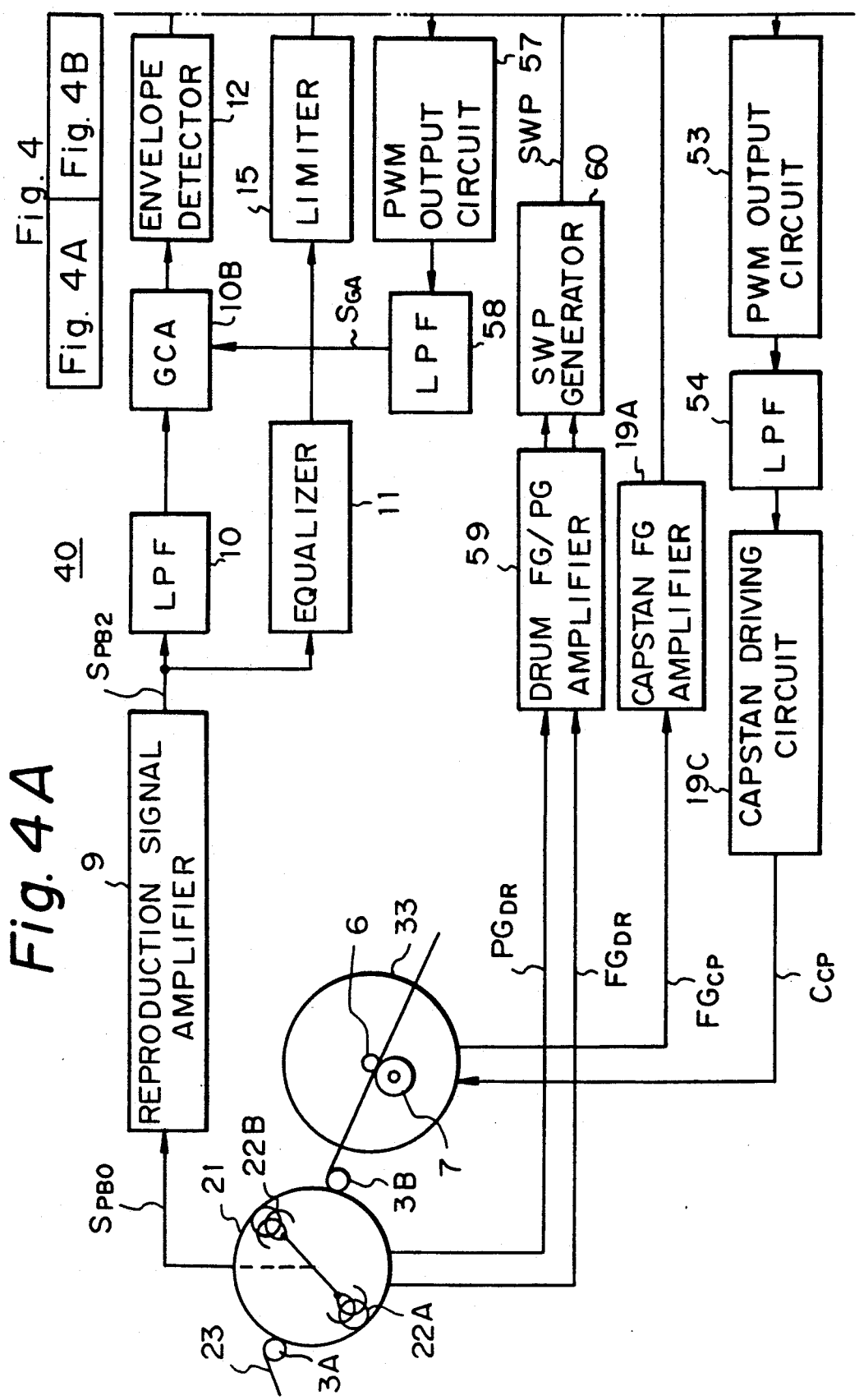

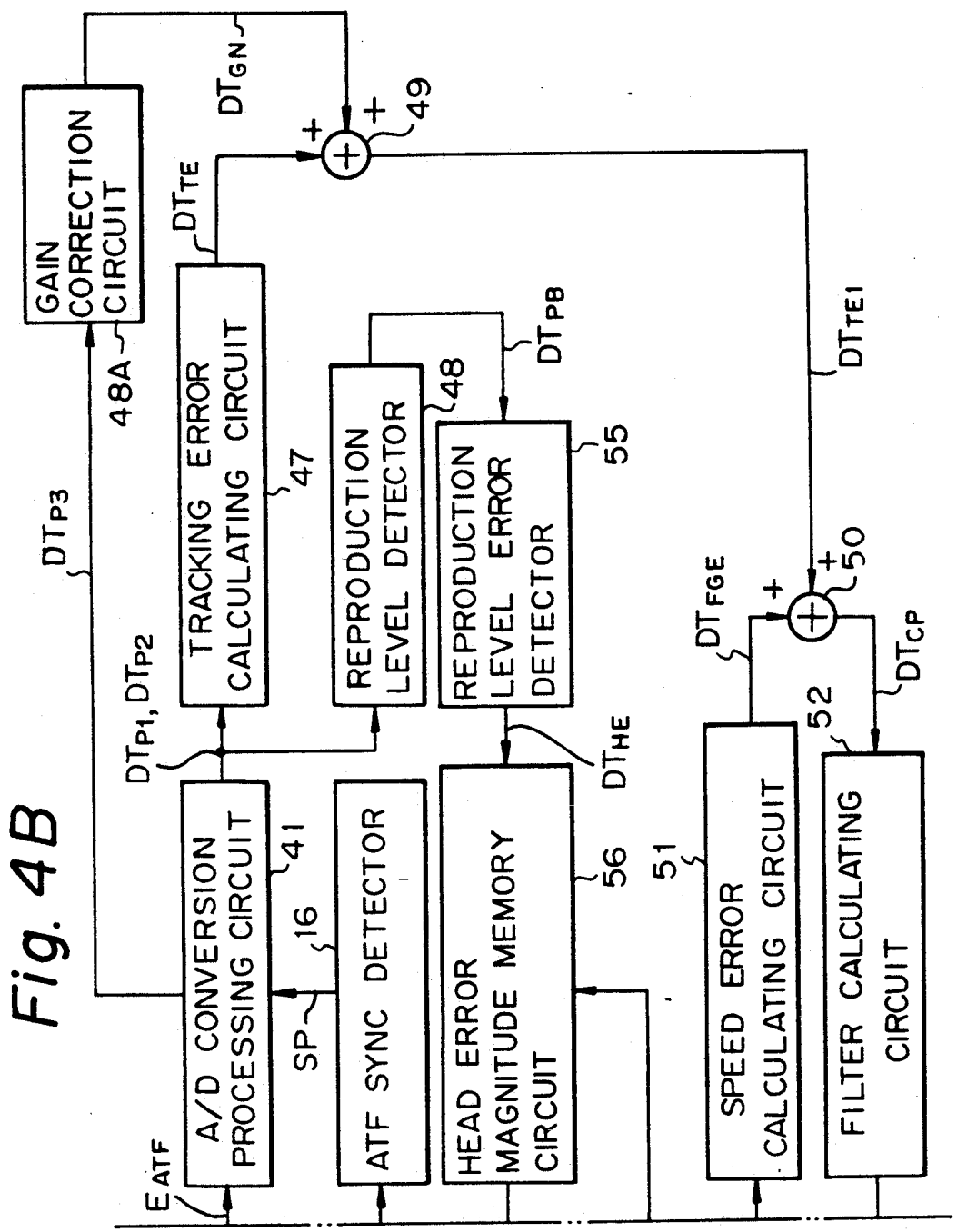

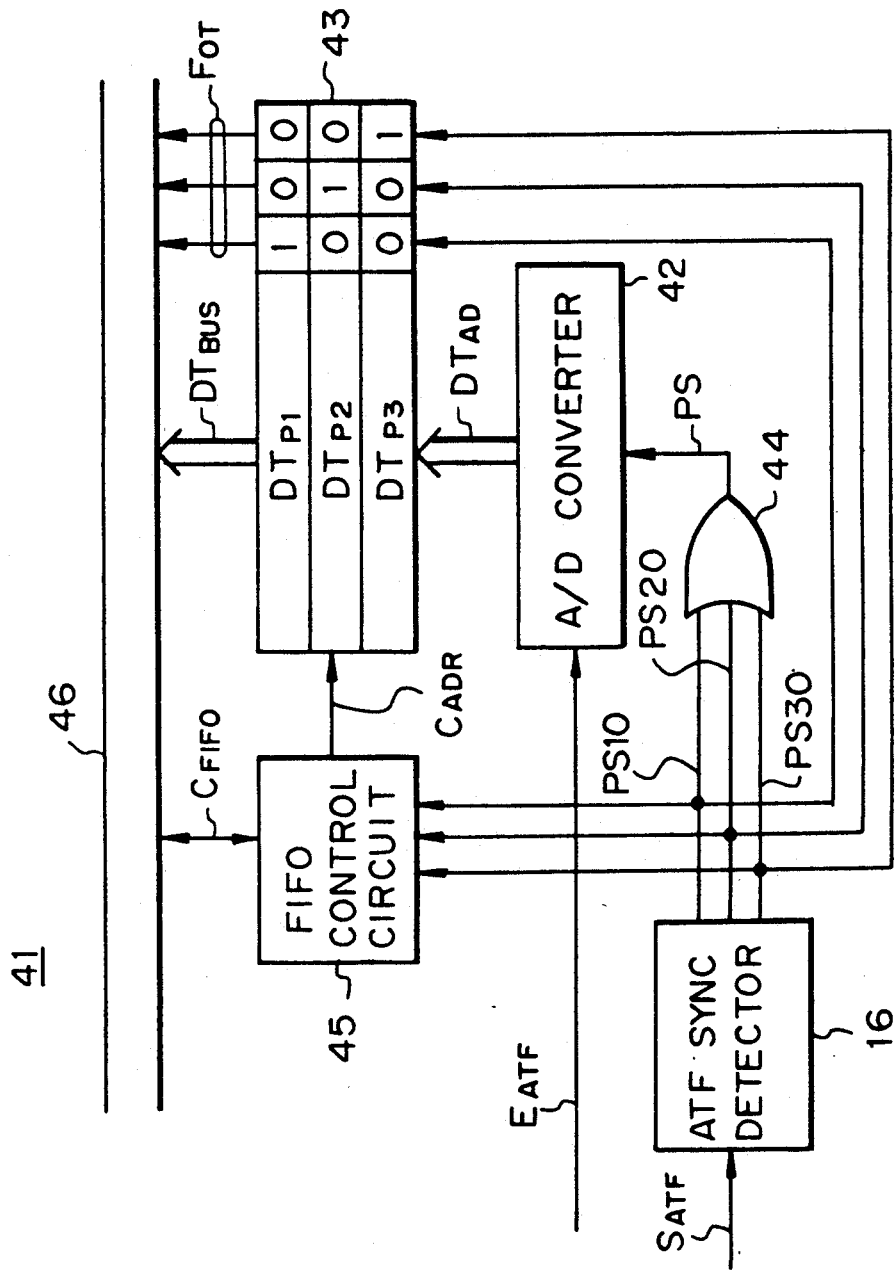

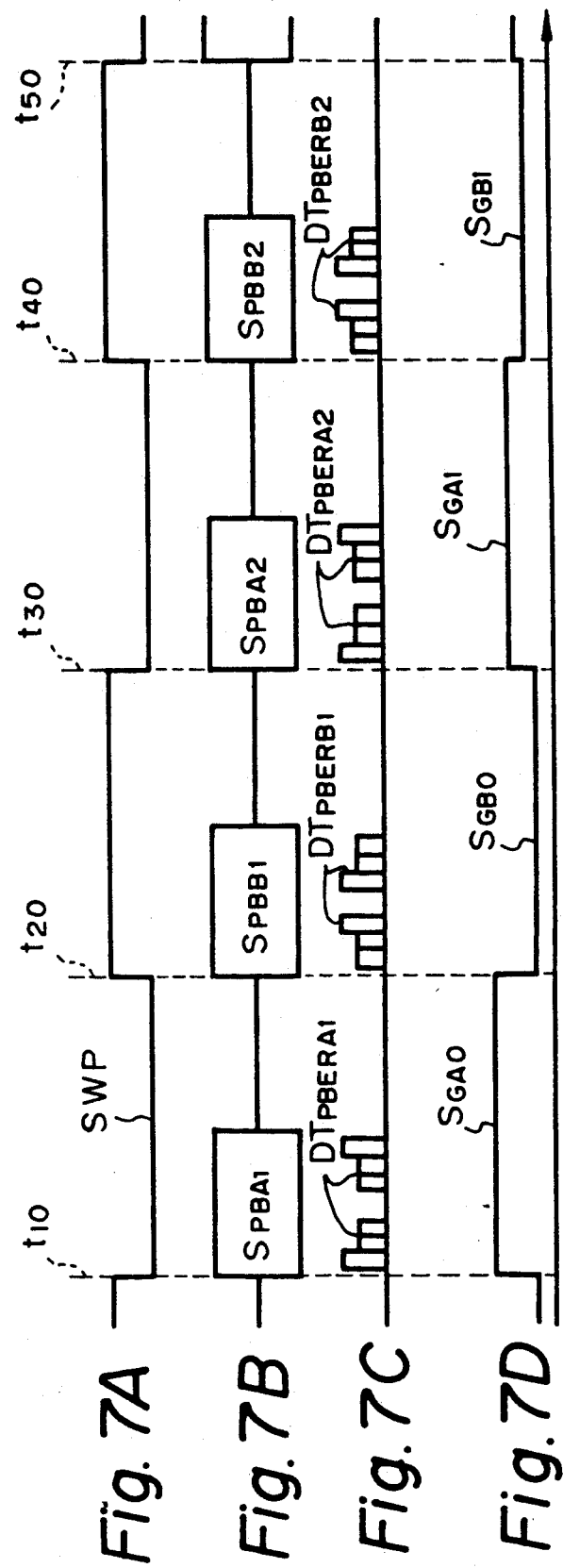

TRACKING CONTROL CIRCUIT INCLUDING GAIN CORRECTION CONTROL

BACKGROUND OF THE INVENTION

1. Field of the Invention

The present invention relates to a tracking control circuit suited, for example, for use in a rotary head type digital audio tape recorder

2. Description of the Prior Art

Conventionally, as a tape recording apparatus capable of recording an audio signal with high density, a rotary head type digital audio tape recorder (hereafter a "DAT") has been employed.

In such a DAT, input audio data is recorded onto a magnetic tape wound around a rotary drum at a predetermined wrap angle using rotary heads arranged on a rotary drum. The recorded audio data on the magnetic tape may also be reproduced using the rotary heads.

To reproduce the recorded audio data on the magnetic tape correctly, the rotary heads must scan a recording track on the magnetic tape in a correct tracking state. For this reason, a tracking control method of the so-called ATF (automatic track following) system is adopted in the DAT.

As shown in FIG. 1, a magnetic tape 2 on which digital audio data is recorded in a DAT format is pulled out of a tape cassette in a DAT (not shown) and guided by inclined guides 3A and 3B. The tape 2 is wound around a rotary drum 5 at a predetermined angle interval. On the rotary drum 5, rotary heads 4A and 4B are arranged with an angle interval of 180° and azimuth angles different from each other. The tape 3 is further sandwiched between a capstan and a pinch roller 7 and reeled into the tape cassette.

Recording tracks of the magnetic tape 2 are formed in an oblique direction with respect to its running direction so that they have alternately positive and negative azimuth angles. In the DAT format, an ATF recording pattern $P_{ATF}$ as shown in FIG. 2 is recorded at predetermined positions on the lower and upper sides of the recording tracks.

More specifically, for example, an ATF sync signal PS is first recorded at a frequency of 522.67 kHz or 784.00 kHz onto a recording track TA, which has a positive azimuth angle, along a scanning direction a of the rotary head 4A.

Subsequently, first and second ATF pilot signals P1 and P2 having a frequency of 130.67 kHz are recorded at a predetermined interval on the recording track TB1 on the precedinq side of recording track TA and on the recording track TB2 on the subsequent side of recording track TA, respectively, both of which have a negative azimuth angle, in response to the position of the ATF sync signal PS. Further, a third pilot signal P3 is recorded with a frequency of 130.67 kHz at a subsequent position on the recording track TA.

In a DAT, the first and second ATF pilot signals P1 and P2 are sampled and held based on the timing of the reproduction of the ATF sync signal PS on the recording track TA. A capstan motor 8 is driven by the difference signal, so that the rotary head 4A is operated to scan the recording track TA in the correct tracking state.

Referring back to FIG. 1, a reproduction signal $S_{PB0}$, which is provided by the playback of recording tracks TA and TB on the magnetic tape 2, is amplified by a reproduction signal amplifier 9, and the resulting amplified reproduction signal $S_{PB2}$ is input to a low-pass filter (LPF) 10A and an equalizer 11.

The LPF 10A passes the low frequency components of ATF pilot signals P1, P2 and P3 contained in the amplified reproduction signal $S_{PB2}$, and these frequency components are supplied to an envelope detector 12 through a variable gain type amplifier (GCA) 10B. An envelope signal $E_{ATF}$ which consists of the basic components of the ATF pilot signals is given to a subsequent first sample/hold circuit 13A and a subtracter 14A.

The equalizer 11 performs a wave equalization of the amplified reproduction signal $S_{PB2}$ depending on the ATF sync signal PS and then supplies it to a limiter 15. As a result, a signal component of the amplified reproduction signal $S_{PB2}$ depending on the ATF sync signal PS is converted into a digital signal at the limiter 15 and given to an ATF sync detector 16.

In response to the detection of the ATF sync signal PS, the ATF sync detector 16 generates a first sampling pulse SP1 which rises and falls with the timing of the detection, and which is sent to the first sample/hold circuit 13A.

The ATF sync detector 16 also generates a second sampling pulse SP2 which rises and falls with a predetermined delay from the first sampling pulse SP1, and which is sent to second and third sample/hold circuits 13B and 13C.

The first sample/hold circuit 13A samples and holds the envelope signal $E_{ATF}$ input from the envelope detector 12 in response to the first sampling pulse SP1 and consequently sends the level of the first ATF pilot signal P1 recorded on the recording track TB1 as an addition input to the subtracter 14A.

The subtracter 14A subtracts the input envelope signal $E_{ATF}$ or the second ATF pilot signal P2 recorded on the recording track TB2 from the first ATF pilot signal P1 and sends a subtracted result to the second sample/hold circuit 13B.

The second sample/hold circuit 13B samples and holds the difference of the first and second ATF pilot signals P1 and P2 with the timing of the second sampling pulse SP2, and sends a resultant signal to an adder 18 of a capstan speed control system as a tracking error signal $S_{TE}$.

A capstan frequency signal $FG_{CP}$ obtained from a capstan motor 8 in the DAT is amplified by a capstan FG amplifier 19A and input to a capstan speed control circuit 19B, which outputs a capstan error signal $S_{CE}$. The signal $S_{CE}$ is supplied to adder 8 where it is added to the tracking error signal $S_{TE}$ and output to a capstan driving circuit 19C.

The capstan driving circuit 19C generates a capstan driving signal $C_{CP}$ depending on the tracking error signal $S_{TE}$ and the capstan error signal $S_{CE}$ and sends it to the capstan motor 8.

In this manner, the speed of the magnetic tape 2 is controlled by a level difference of the first and second ATF pilot signals P1 and P2; and the rotary head 4A is controlled so that it can scan the recording track TA in the correct tracking state by an ATF system.

The amplifying gain of the above-mentioned variable gain amplifier 10B is controlled depending on the sum of the reproduction levels of the first and second ATF pilot signals P1 and P2, and tracking control can be performed accurately by correcting changes of the reproduction levels of the rotary heads 4A and 4B.

As shown in FIG. 3, by correcting the change of the reproduction level of the rotary head 4A, for example, with a signal $S_{WA}$ (indicated by a broken line in FIG. 3) which is the sum of reproduction levels $S_{P1}$ and $S_{P2}$ of the first and second ATF pilot signals P1 and P2, the tracking error signal $S_{TE}$ can be precisely detected as compared with the case where the change of the reproduction levels is detected by a reproduction level $S_{P3}$ of the third ATF pilot signal P3. As a result, the tracking error signal $S_{TE}$ can be detected with greatly increased accuracy.

The envelope signal $E_{ATF}$ sent from the envelope detector 12 and the first ATF pilot signal P1 are also supplied to an adder 14B, and this addition signal is fed to a differential amplifier 17A.

In the differential amplifier 17A, the difference between the addition signal and a voltage corresponding to a reference reproduction level given from a power supply source 17B is amplified and sent to the third sample/hold circuit 13C.

The second sampling pulse SP2, which is the same as that supplied to the second sample/hold circuit 13B, is also supplied to the third sample/hold circuit 13C. Thus, at the timing of the second sampling pulse SP2, the result of a comparison of the sum signal of the first and second ATF pilot signals P1 and P2 and the reference reproduction level is sampled and held, producing a head reproduction level error signal $S_{HE}$. This signal is sent to the variable gain amplifier 10B, and fluctuations in reproduction level of the rotary heads 4A and 4B can thus be corrected effectively on the basis of the sum signal $S_{WA}$ of the reproduction levels $S_{P1}$ and $S_{P2}$ of the first and second ATF pilot signals P1 and P2.

However, in a DAT with such a structure, there are problems with variations due to temperature and circuit characteristics, since a tracking error is detected with analog signal processing.

In particular if such a phenomenon occurs in the first or second sample/hold circuits 12A and 12B, a drift or an offset takes place in a sample/hold characteristic with the result that correct tracking control cannot be accomplished.

Further, since the DAT contains an analog signal processing circuit, externally attached parts are indispensable, causing the entire circuit size to become large.

OBJECTS AND SUMMARY OF THE INVENTION

It is, therefore, an object of the present invention to provide a tracking control circuit for a rotary head type magnetic recording and reproducing apparatus which is capable of preventing variations due to temperature and circuit characteristics, effectively correcting fluctuations of reproduction levels of the magnetic heads and performing tracking control with high accuracy.

According to an aspect of the present invention, there is provided a tracking control circuit of a rotary head type magnetic recording and reproducing apparatus, which positions magnetic heads which generate a reproduction signal on a recording track using first and second pilot signals for tracking provided from the adjacent recording tracks in response to a synchronization signal for tracking which is recorded on the recording track and arranged in an oblique direction with respect to the running direction of the magnetic tape, comprising:

synchronization signal detecting means for generating first and second sampling pulses depending on recording positions of the first and second pilot signals from the timing of detection of the synchronization signal;

envelope detecting means for detecting the first and second pilot signals from the reproduction signal and sending an envelope signal;

analog to digital conversion means for sampling the envelope signal with the timing of the first and second sampling pulses and converting it into digital data, and sending first and second pilot data for tracking depending on the first and second pilot signals;

tracking error detecting means for detecting tracking error data from the difference of the first and second pilot data; and magnetic tape driving means for controlling the feeding speed of the magnetic tape based on the tracking error data.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIGS. 1, 1A and 1B are a block diagram showing a conventional tracking control circuit;

FIGS. 4, 4A and 4B are a block diagram showing a DAT using a tracking control circuit according to one embodiment of the present invention;

FIG. 5 is a block diagram showing a hardware structure of an analog to digital conversion processor;

FIGS. 7A to 7D are timing charts for explaining a control operation of an AGC.

DETAILED DESCRIPTION OF THE PREFERRED EMBODIMENTS

FIGS. 4 through 8 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

One embodiment of the present invention will be described with reference to the drawings hereunder.

a. Whole structure of a DAT

Figure 8:
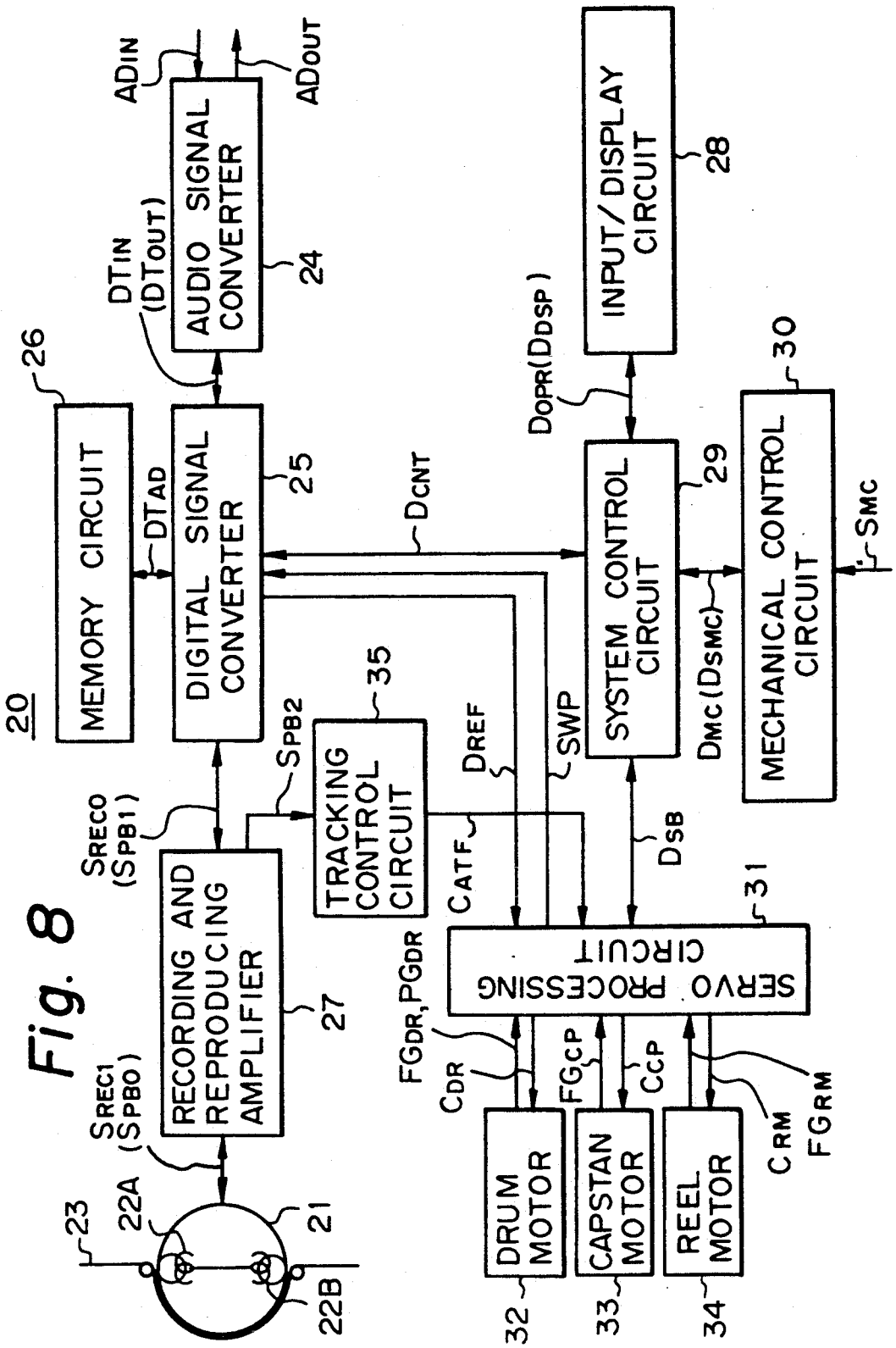
FIG. 8 is a block diagram showing the whole structure of a DAT.

In FIG. 8, reference numeral 20 shows a whole structure of a rotary head type digital audio tape recorder (DAT), and desired audio signals $AD_{IN}$ and $AD_{OUT}$ are recorded or reproduced on a magnetic tape 23 which is wound by a predetermined angle space on a rotary drum 21 using rotary heads 22A and 22B provided on the rotary drum 21.

In the DAT 20, the input audio signal $AD_{IN}$ is first given to an audio signal converter 24 at the time of recording. The audio signal converter 24 has a low-pass filter and an analog to digital converter which converts the input audio signal $AD_{IN}$ into digital data and sends it to the digital signal converter 25 as input digital data $DT_{IN}$.

The digital signal converter 25 temporarily writes the input digital data $DT_{IN}$ into a memory circuit 26 with a RAM (random access memory) structure as input audio data $DT_{AD}$.

The recording portion of the digital signal converter 25 is composed of an error correction code generator, an interleave processor, an 8-10 modulator, a parallel-serial converter, etc.

The error correction code generator reads the audio data $DT_{AD}$ written into the memory circuit 26, generates a parity for error correction and writes it into the memory circuit 26. For the writing and reading of the memory circuit 26, an address corresponding to a data interleave generated at the interleave processor is selected, and the 8-10 modulator reads the input audio data $DT_{AD}$ with the parity for error correction added.

The 8-10 modulator converts the input audio data $DT_{AD}$ of 8 bits into 10-bit data suited for magnetic recording by the rotary heads 22A and 22B and adds a synchronization signal, an address signal, a sub-code signal, an ATF signal, etc.

The digital signal converter 25 converts the recording data thus provided into a recording signal $S_{RECO}$ consisting of serial data in an internal serial to parallel converter and sends it to a recording and reproduction amplifier 27.

The recording and reproducing amplifier 27 is comprised of a recording signal amplifier, a reproducing signal amplifier, a rotary transformer, a wave form equalizer, and so on. The amplifier 27 supplies an amplified recording signal $S_{REC1}$, which is obtained by amplifying the input recording signal $S_{REC0}$ before sending it to the rotary heads 22A and 22B.

In the DAT 20, a recording or reproduction operation may be selectively controlled based on operation data $D_{OPR}$ input to a system control circuit 29 from an input/display circuit 28, which is made up of a microcomputer having, for example, a key board as an input means, and a display panel.

The input/display circuit 28 produces operation data $D_{OPR}$ in response to a user's operation of the input means and generates a display on the basis of display data $D_{DSP}$ given from the system control circuit 29.

The system control circuit 29 also generates mechanical control data $D_{MC}$, signal processing control data $D_{CNT}$, and servo processing control data $D_{SB}$ based on system information preset at the time of recording and the operation data $D_{OPR}$ input from the input/display circuit 28, and sends them to a mechanical control circuit 30, the digital signal processing circuit 25 and a servo processing circuit 31, respectively.

At the time of recording, the servo processing circuit 31 sends a drum driving signal $C_{DR}$, a capstan driving signal $C_{CP}$ and a reel driving signal $C_{RM}$ to a drum motor 32, a capstan motor 33, and a reel motor 34 based on the servo processing control data $D_{SB}$ input from the system control circuit 29, rotationally drives the rotary drum 21 at a predetermined rotation number and runs the magnetic tape 23 at a predetermined speed.

At the same time, a drum phase signal $PG_{DR}$ a drum frequency signal $FG_{DR}$, a capstan frequency signal $FG_{CP}$ and a reel frequency signal $FG_{RM}$ are fed back to the servo processing circuit 31 from the drum motor 32, the capstan motor 33 and the reel motor 34, respectively, so that a velocity servo and/or phase servo may be formed.

An internal reference signal $D_{REF}$ indicative of one interleave period at the time of recording is given by the digital signal converter 25 to the servo processing circuit 31. As a result, the servo processing circuit 31 carries out velocity servo processing and/or phase servo processing on the basis of the internal reference signal $D_{REF}$ and sends back a switching reference signal SWP for the rotary heads 22A and 22B, which is generated based on the input drum phase signal $PG_{DR}$ and the drum frequency signal $FG_{DR}$.

The mechanical control circuit 30 drives and controls a cassette loading mechanism of the DAT cassette, a tape loading mechanism of the magnetic tape 23, etc. based on the mechanical control data $D_{MC}$ input from the system control circuit 29. The circuit 30 then generates mechanical information data $D_{SMC}$ based on sensor information $S_{MC}$ given from the mechanical mechanism and sends it to the system control circuit 29.

The servo processing circuit 31 first drives the drum motor 32 at a speed depending on the servo processing control data $D_{SB}$ given from the system control circuit 29 and at a phase which is synchronized with the internal reference signal $D_{REF}$ at the time of reproduction, and forms the velocity servo and phase servo.

In this state, a reproduction signal $S_{PB0}$ obtained from the rotary heads 22A and 22B is supplied to the recording and reproducing amplifier 27. An amplified reproduction signal $S_{PB2}$ from the amplifier 27 is supplied to a tracking control circuit 35, and a reproduction digital signal $S_{PB1}$ provided through a built-in binary circuit is supplied to the digital signal converter 25.

The tracking control circuit 35 performs tracking control using a synchronization signal for ATF and ATF pilot signals formed on recording tracks of the magnetic tape 23.

The tracking control circuit 35 has an equalizer for detecting a synchronization signal and an ATF envelope detector, which detects an ATF signal from an envelope signal based on the timing in which the synchronization signal is detected in the input reproduction digital signal $S_{PB1}$ and forms an ATF control signal $C_{ATF}$ in response to the ATF signal, which is sent to the servo processing circuit 31.

The servo processing circuit 31 drives and controls the capstan motor 33 depending on the ATF control signal $C_{ATF}$ with the result that an ATF servo loop is formed to enable the rotary heads 22A and 22B to trace recording tracks of the magnetic tape 23 correctly.

In this way, when there is correct reproduction of the recording tracks of the magnetic tape 23, the digital signal converter 25 initiates reproduction processing of the reproduction digital signal $S_{PB1}$.

The reproduction portion of the digital signal converter 25 is constructed of a clock reproducing circuit having a PLL (phase locked loop) structure, a 10-8 demodulator, an error detection/correction circuit, a deinterleave circuit, an interpolating circuit, etc.

The digital signal converter 25 first detects a reproduced clock signal contained in the reproduction digital signal $S_{PB1}$ at the clock reproducing circuit.

As soon as a synchronization signal is detected in the reproduction digital signal $S_{PB1}$, the 10-8 demodulator performs 10-8 demodulation of 10 bits of the reproduction digital signal SPB1 based on the reproduced clock signal detected in the clock reproducing circuit and sequentially writes the resulting 8-bit data into the memory circuit 26 as reproduction audio data $DT_{AD}$.

The reproduced audio data $DT_{AD}$ thus written into the memory circuit 26 is read out by the error detection/correction circuit, and the presence or absence of data error is detected. Simultaneously, if there is a data error, error correction processing is performed using a parity for error correction, and error-corrected data and its correction result are written into the memory circuit 26.

For the writing and reading of the memory circuit 26, an address corresponding to a data deinterleave generated at the deinterleave processing circuit is selected, and the reproduced audio data $DT_{AD}$ subjected to the error detection/correction processing is read out by the interpolating circuit.

The interpolating circuit performs an interpolation operation by a method of calculating an average of preceding and subsequent data with respect to data which cannot be error corrected, etc. and sends it to the audio signal converter 24 as reproduction digital data $DT_{OUT}$.

The audio signal converter 24 has a digital to analog converter and a low-pass filter, and converts the reproduced digital data $DT_{OUT}$ into an analog signal and sends it as a reproduced audio signal $AD_{OUT}$.

Thus, the rotary heads 22A and 22B on the rotary drum 21 reproduce recorded data from the recording tracks on the magnetic tape 23 to provide the reproduced audio signal $AD_{OUT}$.

b. The tracking control circuit

Figure 1A:
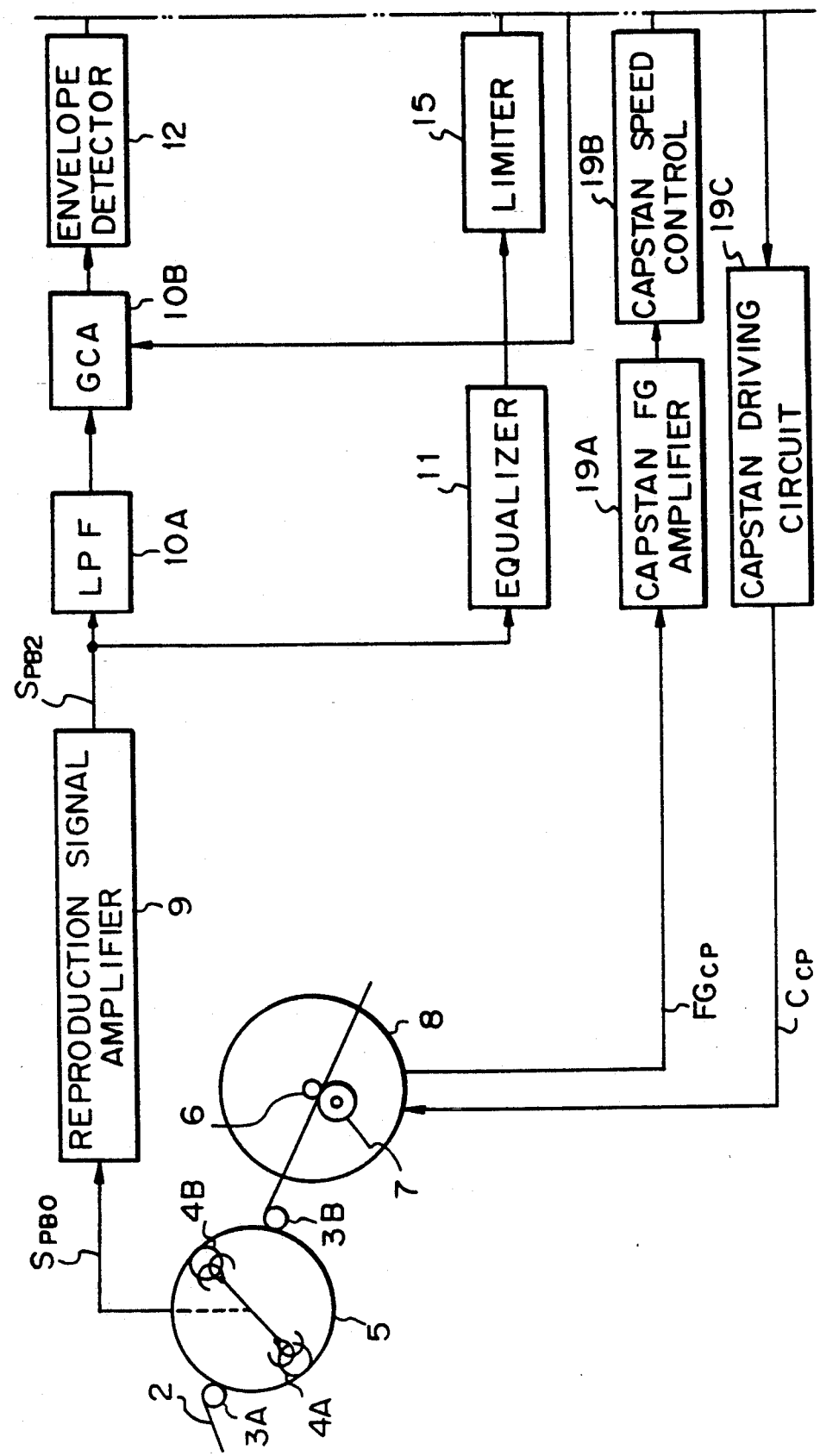
Figure 1B:
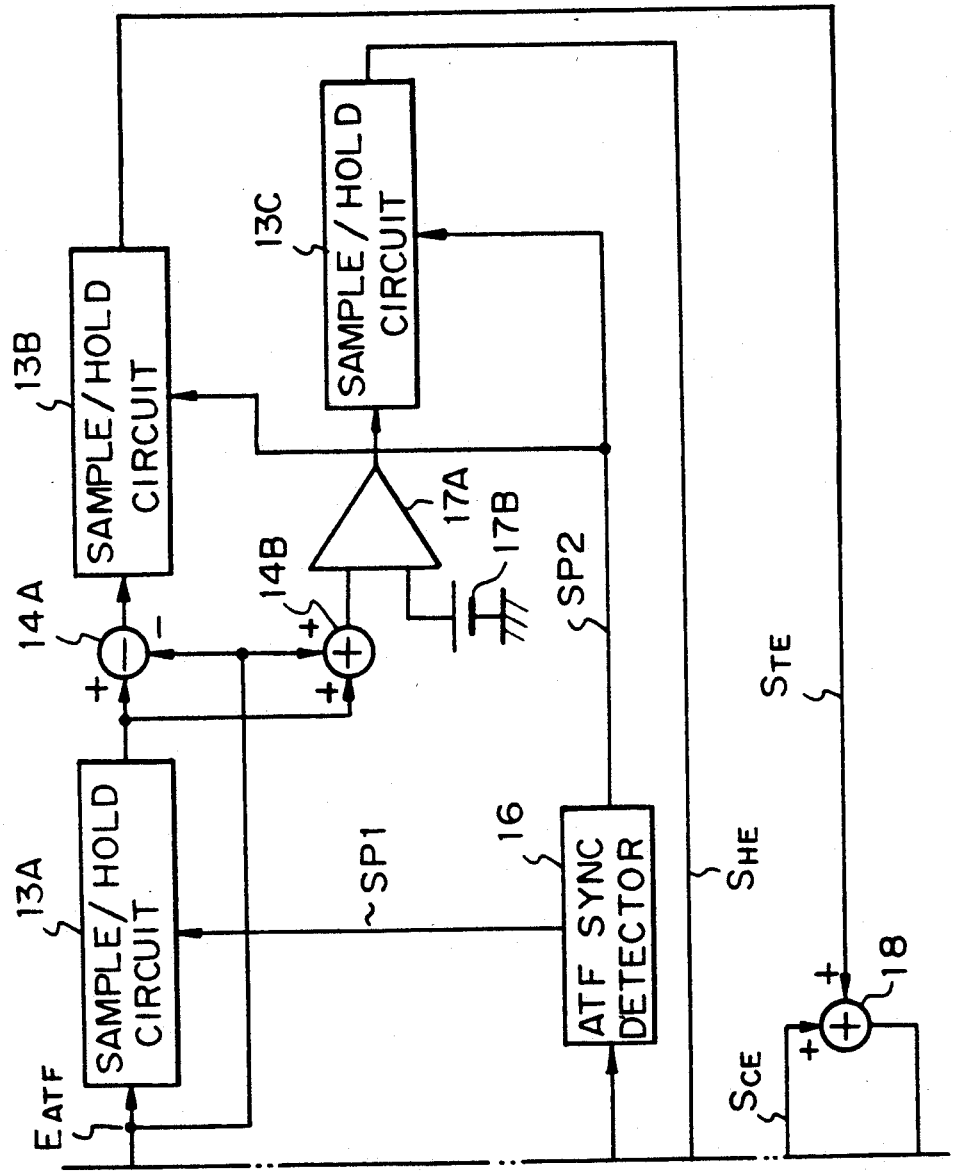

In FIG. 4 the same reference numerals are used for parts corresponding to those in FIG. 1. A DAT 40 using the tracking control circuit according to the present invention is illustrated. In this case, an envelope component sent from the envelope detector 12 is given to an analog to digital conversion processor 41.

Figure 2:
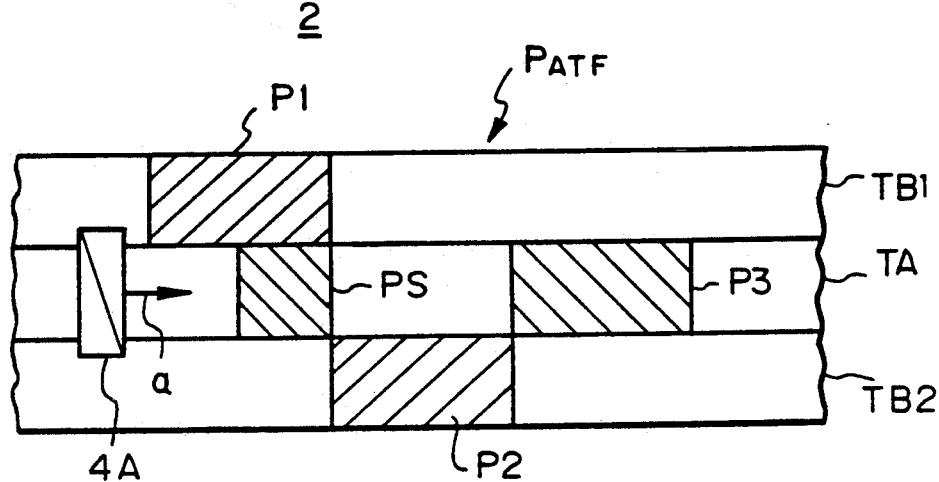
FIG. 2 is a schematic diagram showing an ATF recording area according to a DAT format.
Figure 3:
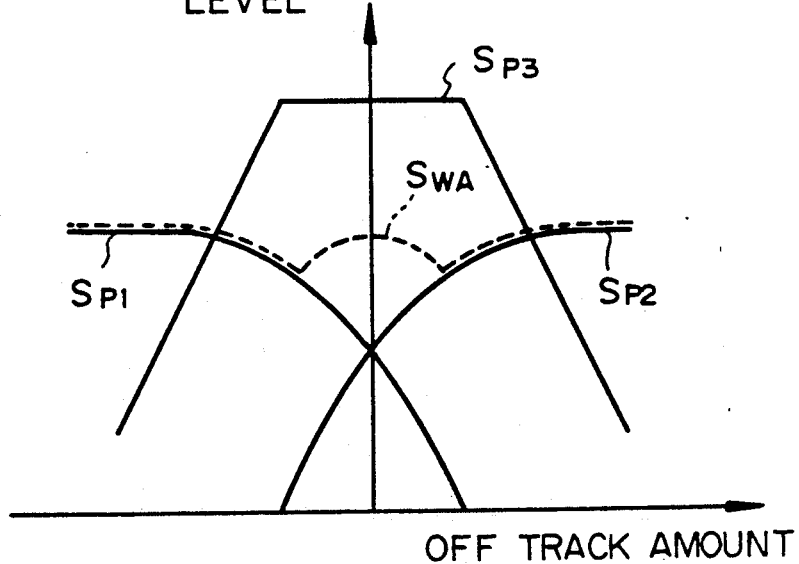
FIG. 3 is a characteristic curve diagram illustrating a reproduction characteristic of an ATF pilot signal.

An ATF sync detector 16 generates first, second and third sampling pulses PS10, PS20 and PS30 which rise and fall depending on positions of first, second and third ATF pilot signals P1, P2 and P3 based on the timing of a detected ATF sync signal PS (FIG. 2) and sends them to the analog to digital conversion processor 41.

The analog to digital conversion processor 41 samples an envelope component input at the timing of the sampling pulses PS10, PS20 and PS30 sent from the ATF sync detector 16 and converts it into digital data, and first, second and third ATF pilot data $DT_{P1}$, $DT_{P2}$ and $DT_{P3}$ corresponding to the levels of the three ATF pilot signals P1, P2 and P3 are generated. The analog to digital conversion processor 41 comprises an analog to digital converter 42 and a microcomputer having a FIFO (first infirst out) memory 43 of 3 words as shown in FIG. 5.

An envelope signal $E_{ATF}$ (FIG. 6A) sent from the envelope detector 12 is first given to the internal analog to digital converter 42, and the three sampling pulses PS10, PS20 and PS30 (FIGS. 6B to 6D) sent from the ATF sync detector 16 are supplied to A/D converter 42 through an OR circuit 44 as a sampling pulse PS.

As a result, A/D converter 42 samples the input envelope signal $E_{ATF}$ at times t1, t2 and t3 (FIG. 6E), i.e. where the three sampling pulses PS10, PS20 and PS30 rise, and then initiates analog to digital conversion processing.

Figures 6A, 6B, 6C, 6D, 6E, 6F, 6G:
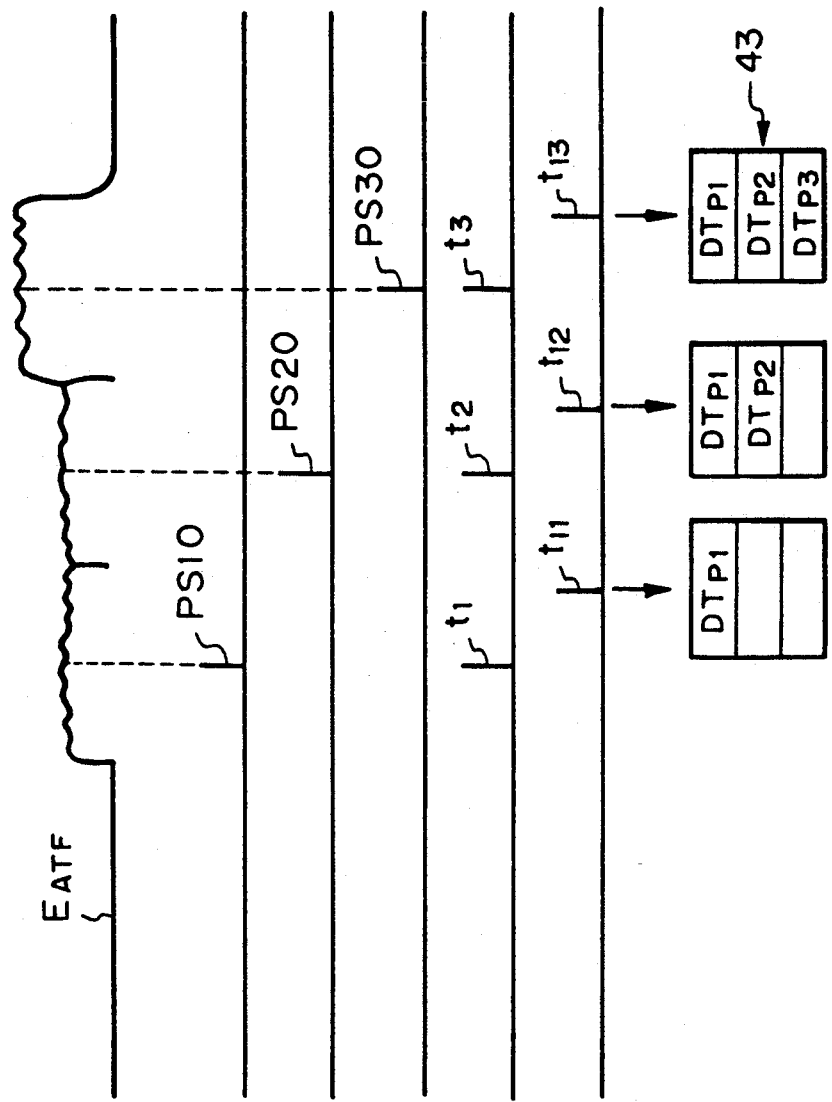
FIGS. 6A to 6G are schematic diagrams for explaining the operation of the A/D processor of FIG. 5.

The analog to digital conversion processing is completed at subsequent time points $t_{11}$, $t_{12}$ and $t_{13}$ (FIG. 6F), and A/D converter 42 writes the obtained first, second and third ATF pilot data $DT_{P1}$, $DT_{P2}$ and $DT_{P3}$ into a FIFO memory 43 sequentially in response to an address control signal $C_{ADR}$ given from a F1FO control circuit 45 (FIG. 6G).

The three sampling pulses PS10, PS20 and PS30 are input to the FIFO control circuit 45, which generates the address control signal $C_{ADR}$ indicative of an address of the FIFO memory 43 in order of rising pulses.

In this way, the addresses for the first, second and third ATF pilot data $DT_{P1}$, $DT_{P2}$ and $DT_{P3}$ sent from the A/D converter 42 are generated.

The lower three bits of the FIFO memory 43 are as a data flag $F_{DT}$ indicative of the type of the first, second and third ATF pilot data $DT_{P1}$, $DT_{P2}$ and $DT_{P3}$. The third bit, second bit and first bit from the last bit are set to "1" depending on the rising pulses of the three sampling pulses PS10, PS20 and PS30.

In this manner, the first, second and third ATF pilot data $DT_{P1}$, $DT_{P2}$ and $DT_{P3}$ stored in the FIFO memory 43 of the analog to digital conversion processor 41 are read out as bus data $DT_{BUS}$ in response to a FIFO control signal $C_{FIFO}$ input via an internal bus 46 and sent to a tracking error calculating circuit 47, a gain correction circuit 48A and a reproduction level detector 48, respectively.

The tracking error calculating circuit 47 reads out the first and second ATF pilot data $DT_{P1}$ and $DT_{P2}$, calculates a difference between the first and second ATF pilot data $DT_{P1}$ and $DT_{P2}$, and sends the difference as first tracking error data $DT_{TE}$ to an adder 49.

The gain correction circuit 48A reads out the third ATF pilot data $DT_{P3}$ from the A/D conversion circuit 41 (FIG. 4B), compares this with a reference level, generates gain correction data $DT_{GN}$ for correcting gain loss and sends this data to the adder 49. As a result, almost ideal second tracking error data $DT_{TE1}$ is provided by adding the first tracking error data $DT_{TE}$ and the gain correction data $DT_{GN}$. The resulting second tracking error data $DT_{TE1}$ then supplied to another adder 50.

The capstan frequency signal $FG_{CP}$ provided through the capstan FG amplifier 19A of the servo processing circuit 31 (FIG. 8) is supplied to a speed error calculating circuit 51, and speed error data $DT_{FGE}$ obtained based on speed reference data is given to the adder 50.

The adder 50 adds the first tracking error $DT_{TE1}$ and the speed error data $DT_{FGE}$, producing capstan control data $DT_{CP}$ which is given to a filter calculating circuit 52 and subjected to a predetermined filtering operation. The data $DT_{CP}$ is then modulated at a PWM (pulse width modulation) output circuit 53 and supplied to the capstan driving circuit 19C through a low pass filter 54.

As a result, the capstan driving circuit 19C generates the capstan driving signal $C_{CP}$ depending on the capstan control data $DT_{CP}$ and supplies it to the capstan motor 33.

The feeding speed of the magnetic tape 23 is thus controlled depending on tracking error data $DT_{TE}$, which is the difference between the first and second ATF pilot data $DT_{P1}$ and $DT_{P2}$.

In this way, in the tracking control circuit of the DAT 40, the rotary heads 22A and 22B scan the corresponding recording tracks TA and TB of the magnetic tape 23 in the correct tracking state using the ATF synchronization signal PS and the ATF pilot signals P1 and P2 recorded on the recording tracks TA and TB on the magnetic tape 23.

In this embodiment, the reproduction level detector 48 reads the first and second ATF pilot data $DT_{P1}$ and $DT_{P2}$ and adds them to send reproduction level data $DT_{PB}$ to a subsequent reproduction level error detector 55.

The reproduction level error detector 55 detects the magnitude of the level error of the input reproduction level data $DT_{PB}$ based on an internal reference reproduction level $DT_{PBREF}$ and sends reproduction level error data $DT_{HE}$ to a head error magnitude memory circuit 56.

The drum phase signal $PG_{DR}$ and the drum frequency signal $FG_{DR}$ obtained through a drum FG/PG amplifier 59 of the servo processing circuit 31 (FIG. 8) are given to a switching reference signal (SWP) generator 60.

In the SWP generator 60, a switching reference signal SWP is generated which is inverted at the timing in which the rotary heads 22A and 22B respectively come into contact with recording tracks on the magnetic tape 23, and is sent to the head error magnitude memory circuit 56 which has two pairs of double buffer structure.

As shown in FIGS. 7A to 7D, the head error magnitude memory circuit 56 stores, based on a logical level of the switching reference signal SWP, reproduction level error data $DT_{HE}$ ($DT_{PBERA1}$, $DT_{PBERA2}$) input depending on the three ATF pilot signals P1, P2 and P3 at times $t_{10}$ to $t_{20}$ and $t_{30}$ to $t_{40}$ at which the first rotary head 22A contacts the recording track TA on the magnetic tape 23, into one buffer of the first double buffer corresponding to the first rotary head 22. Reproduction level error data $DT_{HE}$ ($DT_{PBERA0}$, $DT_{PBERA1}$) which is stored in the other buffer of the first double buffer, is PWM-modulated by the PWM output circuit 57 and supplied through the low pass filter (LPF) 58 to a gain control amplifier (GCA) 10B as gain control signals $S_{GA0}$ and $S_{GA1}$. In this way, the amplifying gain of the GCA 10B is controlled so that fluctuations in the reproduction level of the first rotary head 22A are corrected depending on the reproduction level error data $DT_{HE}$.

Similarly, in response to the logical level of the switching reference signal SWP, input reproduction level error data $DT_{HE}$ ($DT_{PBERB1}$, $DT_{PBERB2}$) is stored at times $t_{20}$ to $t_{30}$ and $t_{40}$ to $t_{50}$ at which the second rotary head 22B contacts the recording track TB on the magnetic tape 23, in one buffer of the second double buffers. Reproduction level error data $DT_{HE}$ ($DT_{PBERB0}$, $DT_{PBERB1}$) is stored in the other buffer of the second double buffers and supplied through the PWM output circuit 57 and the LPF 58 to the GCA 10B as gain control signals $S_{GB0}$ and $S_{GB1}$. In this way, the amplifying gain of the GCA 10B is controlled so that fluctuations in the reproduction level of the second rotary head 22B are corrected depending on the reproduction level error data $DT_{HE}$.

With the foregoing structure, the sampling pulses PS10 and PS20 of the first and second ATF pilot signals P1 and P2 based on the ATF synchronization signal PS on the recording tracks TA and TB are generated, the envelope signal $E_{ATF}$ depending on the ATF pilot signals is detected from a reproduced and amplified signal which is obtained by the amplification of the reproduction signal $S_{PB0}$ reproduced by the magnetic heads 22A and 22B with a predetermined gain, the tracking error data $DT_{TE}$ is detected from difference data of the first and second ATF pilot data $DT_{P1}$ and $DT_{P2}$ obtained by sampling the envelope signal $E_{ATF}$ with the sampling pulses PS10 and PS20, reproduction level error data $DT_{HE}$ is detected from sum data, the feeding speed of the magnetic tape 23 is controlled based on the tracking error data $DT_{TE}$, and an amplifying gain of the reproduction signal $S_{PB0}$ is controlled based on the reproduction level error data $DT_{HE}$. As a result, a tracking control circuit where deviations of reproduction levels of the magnetic heads 22A and 22B are effectively corrected and where the tracking control of the magnetic heads 22A and 22B on the magnetic tracks TA and TB is precise can be realized.

From the above description, it will be apparent that the invention disclosed herein provides a novel and advantageous apparatus for tracking control for use in, for example, a rotary head type DAT.

The foregoing discussion discloses and describes merely exemplary methods and embodiments of the present invention. As will be understood by those familiar with the art, the invention may be embodied in other specific forms without departing from the spirit or essential characteristics thereof.

For example, although the present embodiment stores the analog to digital converted ATF pilot data $DT_{P1}$, $DT_{P2}$ and $DT_{P3}$ in a FIFO memory, the present invention is not limited to this embodiment. Such data may be held in another memory means such as an RAM or a latch circuit to achieve an effect similar to that in the above-stated embodiment.

Similarly, in the above-mentioned embodiment, the case where the third ATF pilot signal P3 is reproduced for gain correction has been described. However, this may be omitted when necessary, and in this case, the circuit structure can be simplified further while maintaining the minimum tracking control characteristic.

Finally, although the present invention has been applied to a tracking control circuit of the rotary head type digital audio tape recorder in the abovestated embodiment, the invention is not limited to this embodiment. The invention is widely applicable to a tracking control circuit of another rotary head type magnetic recording and reproducing apparatus such as a video tape recorder or a data recorder.

Accordingly, the disclosure of the present invention is intended to be illustrative, but not limiting, of the scope of the invention, which is set forth in the following claims.

What is claimed is:

1. A tracking control circuit of a rotary head type magnetic recording and reproducing apparatus, which positions magnetic heads which generate a reproduction signal from a recording track using a first pilot signal and a second pilot signal for tracking reproduced from adjacent recording tracks in response to a synchronization signal for tracking which is recorded on the recording track, the recording tracks being arranged in an oblique direction with respect to the running direction of the magnetic tape, and wherein a third pilot signal is recorded on the recording track after the synchronization signal, comprising:

synchronization signal detecting means for generating a first sampling pulse, a second sampling pulse, and a third sampling pulse depending on the recording positions of the first pilot signal, the second pilot signal, and the third pilot signal relative to the synchronization signal;

envelope detecting means for detecting the first pilot signal, the second pilot signal, and the third pilot signal from the reproduction signal and generating an envelope signal;

analog to digital conversion means for sampling the envelope signal with the timing of the first sampling pulse, the second sampling pulse and the third sampling pulse and converting it into digital data in the form of first pilot data, second pilot data, and third pilot data for tracking depending on the first pilot signal, the second pilot signal, and the third pilot signal;

gain correction means supplied with the third pilot data for comparing the third pilot data with predetermined reference data and generating corresponding gain correction data for correcting gain or loss;

tracking error detecting means supplied with the first pilot data and the second pilot data for generating tracking error data from the first pilot data and the second pilot data, the tracking error detecting means including adding means for adding the gain correction data to the tracking error data to produce gain corrected tracking error data; and magnetic tape driving means supplied with the gain corrected tracking error data for controlling the feeding speed of the magnetic tape based on the gain corrected tracking error data.

2. A tracking control circuit of a rotary head type magnetic recording and reproducing apparatus, which positions magnetic heads which generate a reproduction signal on a recording track using a first pilot signal and a second pilot signal for tracking provided from the adjacent recording tracks in response to a synchronization signal for tracking which is recorded on the recording track and arranged in an oblique direction with respect to the running direction of the magnetic tape, comprising:

first and second rotary magnetic heads;

a head error magnitude memory;

a servo processing circuit, including a drum amplifier for producing a drum phase signal $PG_{DR}$ and the drum frequency signal $FG_{DR}$;

a head error magnitude memory circuit which has two pairs of double buffers;

synchronization signal detecting means for generating first and second sampling pulses depending on the recording positions of the first and second pilot signals relative to the synchronization signal;

variable gain amplifying means for amplifying the reproduction signal with a predetermined amplifying gain to produce an amplified, reproduction signal;

reproduction level error data detecting means for detecting a magnitude of a reproduction level error of the magnetic heads from the first and second pilot data based on an internal reference reproduction level and generating reproduction level error data to the head error magnitude memory circuit;

reproduction level correcting means for controlling the amplifying gain of the variable gain amplifying means depending on the reproduction level error data;

envelope detecting means for detecting the first and second pilot signals from the amplified reproduction signal and generating an envelope signal;

analog to digital conversion means for sampling the envelope signal with the timing of the first and second sampling pulses and converting it into digital data, and generating first and second pilot data for tracking depending on the first and second pilot signals;

tracking error detecting means supplied with the first and second pilot data for generating tracking error data from the first and second pilot data;

magnetic tape driving means supplied with the tracking error data for controlling the feeding speed of the magnetic tape based on the tracking error data;

a switching reference signal generator supplied with the drum phase signal $PG_{DR}$ and the drum frequency signal $FG_{DR}$ for producing a switching reference signal SWP which is inverted at the timing in which the rotary heads respectively come into contact with recording tracks on the magnetic tape, and sending signal SWP to the head error magnitude memory circuit;

pulse width modulation (PWM) means;

a low pass filter; and wherein the head error magnitude memory circuit stores, based on a logical level of the switching reference signal SWP, reproduction level error data $DT_{HE}$ ($DT_{PBERA1}$, $DT_{PBERA2}$) input depending on the first and second pilot signals at times at which the first rotary head contacts the recording track, into one buffer of a first double buffer of the memory means corresponding to the first rotary head, and reproduction level error data $DT_{HE}$ ($DT_{PBERA0}$, $DT_{PBERA1}$) stored in another buffer of the first double buffer, is PWM-modulated by the PWM means and supplied through the low pass filter to the variable gain amplifying means as gain control signals so that the gain of the variable gain amplifying means is controlled so that fluctuations in the reproduction level of the first rotary head are corrected depending on the reproduction level error data $DT_{HE}$; and wherein the head error magnitude memory circuit, in response to the logical level of the switching reference signal SWP, stores input reproduction level error data $DT_{HE}$ ($DT_{PBERB1}$, $DT_{PBERB2}$) at times at which the second rotary head contacts the recording track on the magnetic tape, in one buffer of a second one of the double buffers and reproduction level error data $DT_{HE}$ ($DT_{PBERB0}$, $DT_{PBERB1}$) stored in the other buffer of the second double buffers is supplied through the PWM output circuit and the low pass filter to the variable gain amplifying means as gain control signals so that the amplifying gain of the variable gain amplifying means is controlled so that fluctuations in the reproduction level of the second rotary head are corrected depending on the reproduction level error data $DT_{HE}$.

* * * * *